United States Patent [19]

Ueda et al.

[11] Patent Number: 4,740,076
[45] Date of Patent: Apr. 26, 1988

[54] FOCUSING APPARATUS FOR USE IN VIDEO CAMERA

[75] Inventors: Kazuhiko Ueda; Hiroshi Haga, both of Yokohama, Japan

[73] Assignee: Victor Company of Japan, Ltd., Japan

[21] Appl. No.: 75,833

[22] Filed: Jul. 17, 1987

[30] Foreign Application Priority Data

Jul. 18, 1986 [JP] Japan .............................. 61-110210[U]

[51] Int. Cl.$^4$ ............................................... G03B 3/00
[52] U.S. Cl. .................................. 354/400; 354/195.1; 352/140; 358/227
[58] Field of Search ............ 354/400, 402, 409, 195.1, 354/195.13; 352/140; 358/227

[56] References Cited

U.S. PATENT DOCUMENTS 4,422,746 12/1983 Meguro et al. ...................... 354/409
4,556,907 12/1985 Urata et al. .......................... 352/140
4,572,643 2/1986 Akashi ................................... 354/409

Primary Examiner—Russell E. Adams
Attorney, Agent, or Firm—Lowe, Price, LeBlanc, Becker & Shur

[57] ABSTRACT

A focusing apparatus for performing the switching operation between the automatic focus mode and the manual command focus mode. The focusing apparatus includes a selection circuit which is provided between an automatic focusing circuit and a manual command focusing circuit for selectively deriving first or second drive signals therefrom so that either of the first or second drive signals is supplied to a drive device for allowing the movement of a focusing lens in the optical axis directions. The manual command focusing circuit is arranged to generate the second drive signal in response to a manipulation of a switch device, the output of which is also coupled to the selection circuit so that the switching operation is effected in accordance therewith. Also included in the focusing apparatus is a timing delay circuit coupled to the switch device so that the generation of the second drive signal is interrupted for a predetermined time period after the switching operation is effected between the automatic focus mode and manual command focus mode. This ensures the prevention of production of an undesired image on the switching operation.

3 Claims, 3 Drawing Sheets

FOCUSING APPARATUS FOR USE IN VIDEO CAMERA

BACKGROUND OF THE INVENTION

The present invention relates generally to a focusing apparatus for use in video cameras, and more particularly to such a focusing apparatus which allows the switching operation from the automatic focus mode to the manual command focus mode.

Known is a video camera having an optical system with an automatic focuing device for permitting the automatic movement of a focusing lens in the directions of the optical axis and with a manual focus device for allowing the manual movement of the focusing lens in the directions of the optical axis. Such a video camera is arranged such that the selection between the automatic focuse mode and the manual focus mode is made in response to a swiching operation by the video camera user. The movement of the focusing lens in the automatic focus mode is effected by rotation of a motor in accordance with an automatic focus system and the movement thereof in the manual focus mode is performed by rotating a focus ring manually made by the video camera user, which focus ring holding the focusing lens is provided in the rear part of the optical system with respect to its objective lens.

Recently, improvement for video cameras is being made for size-reduction purposes wherein one attempt involves designing the optical system partly encased within the video camera body, i.e., the optical system is relocated closer to the camera tube, so as to shorten the overall length of the video camera by reducing the protrusion of the optical system protruded from the video camera body. However, this pauses a problem that the focus ring holding the focusing lens now within the video camera body becomes inaccessible to the user from the outside of the video camera, thus a solution to this problem has been sought.

SUMMARY OF THE INVENTION

It is therefore an object of the present invention to provide a new and improved focusing apparatus which is capable of providing both the automatic focuse function and the manual command focuse function for a small-sized video camera.

Another object of the present invention is to elimination of an undesirable image produced at a transition of switching operation between the automatic focuse mode and the manual focuse mode.

In accordance with the present invention, there is provided a focusing apparatus for performing smooth operation at the swiching movement from the automatic focuse mode and the manual command focuse mode. The focusing apparatus includes a selection circuit which is provided between an automatic focuse circuit and a manual command focuse circuit for selectively deriving first or second drive signal therefrom so that either of the first and second drive signals is supplied to a drive device for allowing the movement of a focusing lens along the optical axis bidirectionally. The manually focusing circuit is arranged to generate the second drive signal in response to the depressing operation of a switch device, the output of which is also coupled to the selection circuit so that the switching operation is effected in accordance therewith. Also included in the focusing apparatus is a timing circuit coupled to the switch device so that the generation of the second drive signal is interrupted for a predetermined time period right after the initiation of switching operation between the automatic focuse mode and manual command focuse mode.

BRIEF DESCRIPTION OF THE DRAWINGS

The object and features of the present invention will become more readily apparent from the following detailed description of the preferred embodiments taken in conjunction with the accompanying drawing in which.

DETAILED DESCRIPTION OF THE INVENTION

Figure 1:
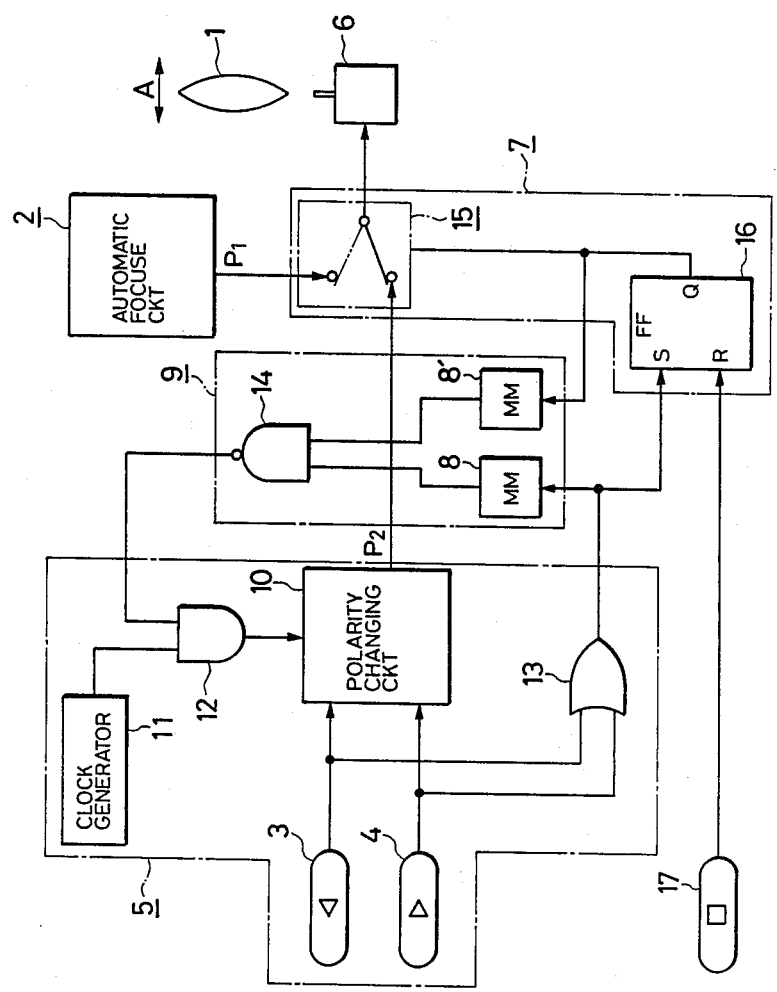
FIG. 1 is a illustration of a focusing apparatus according to an embodiment of the present invention.

Referring now to FIG. 1, there is illustrated a focusing apparatus according to an embodiment of the present invention which is shown as comprising an automatic focusing circuit 2, a manual focusing circuit 5, a selection circuit 7 and a timing circuit 9. The automatic focusing circuit 2 is coupled through a switching circuit 15 of the selection circuit 7 to a pulse motor 6 for allowing the movement of a focusing lens 1 in the optical axis bidirectionlly, i.e., in the directions indicated by an arrow A in the drawing. The image device not shown is located adjacent to the focus lens 1 for producing an image signal in response to the incident light from the object which is also not shown. Both the focus lens 1 and the image device are encased within the camera body not shown. The automatic focusing circuit 2 is of the known type, for example, wherein generated is a drive signal P1 with the number of pulses corresponding to the moving distance of the focusing lens 1 necessary to bring the focusing lens 1 into the focus position. Here, the focussing lens 1 is moved in the direction away from the image device in response to the positive pulse P1 from the automatic focusing circuit 2 and moved in the direction foward the image device in response to the negative pulse P1 therefrom.

Figure 4:
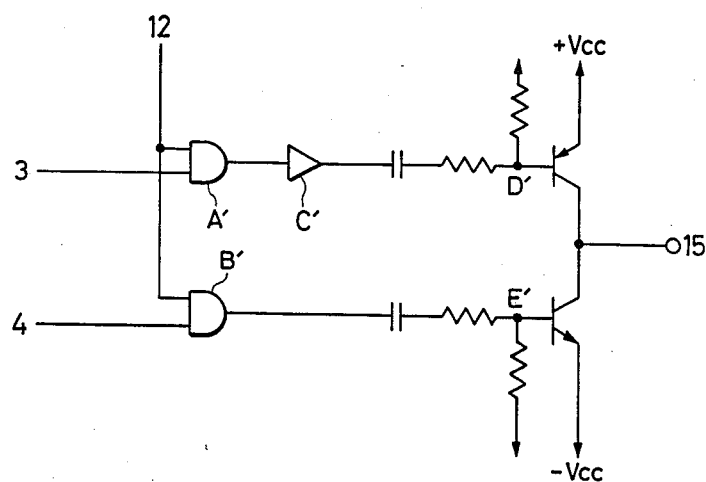
FIG. 4 shows an arrangement of a polarity changing circuit.

The manual command focuse circuit 5 includes first and second switches 3, 4 which may be of push button momentarily ON type and cause the focusing lens 1 to be moved while the respective switch is depressed in the forwarding and backwarding directions for manual command focus operation and the first and second switches 3, 4 are connected to a polarity changing circuit 10 whose detailed arrangement is shown in FIG. 4. That is, the polarity changing circuit 10 comprises two AND gates A' and B' the AND gate being coupled to the first switch 3 and the AND gate B' being coupled to the second switch 4. The output of the AND gate A' is supplied through an inverter C' to a motor driver D' and the output of the AND gate B' is directly supplied to another motor driver E'. The polarity changing circuit 10 generates the drive signal P2 comprising positive pulses in response to the depressing operation of the first switch 3 and generates the drive signal P2 comprising negative pulses in response to depressing operation of the second switch 4. The first and second switches 3, 4 are respectively arranged to produce a high-level signal in response to the depression. The output signals of the first and second switches 3, 4 are also supplied to the input terminals of an OR gate 13 of the manual command focuse circuit 5. Also included in the manual command focuse circuit 5 is a clock pulse generator 11 for supplying a clock pulse through an AND gate to the polarity changing circuit 10 which in turn generates the drive signal P2 in synchronism with the clock pulse.

The drive signal P2 from the polarity changing circuit 10 is supplied to the selection circuit 7 comprising the switching circuit 15 and a RS flip-flop circuit (FF) 16 for operation of the switching circuit 15. Either of the drive signal P1 from the automatic focusing circuit 2 and the drive signal P2 from the manual focusing circuit 5 is selectively applied to the pulse motor 6 in accordance with the output of the flip-flop circuit 16. More specifically, to the set terminal S of the flip-flop circuit 16 there is coupled the gate output of the OR gate 13 of the manual command focuse circuit 5 whereby the Q output of the flip-flop circuit 16 becomes in the high-level state under the condition of the depressing operation of the first or second switch 3, 4. In this embodiment, when the Q output thereof is in the high-level state, the switching circuit 15 takes the position, indicated by a solid line in the drawing, for establishing a circuit between the manual command focuse circuit 5 and the pulse motor 6 so that the drive signal P2 is supplied to the pulse motor 6.

On the other hand, to the reset terminal R of the flip-flop circuit 16 there is coupled a third switch 17 which may be of push button momentarily ON type for generating a high-level signal in response to the depressing operation which causes the focus mode change from manual to automatic. The generation of the high-level signal causes the flip-flop circuit 16 to be reset so that the Q output thereof becomes in the low-level state. In this embodiment, when the Q output thereof is in the low-level state, the switching circuit 15 takes another position, indicated by a dash-and-dot line in the drawing, for establishing a circuit between the automatic focusing circuit 2 and the pulse motor 6.

Figure 2:
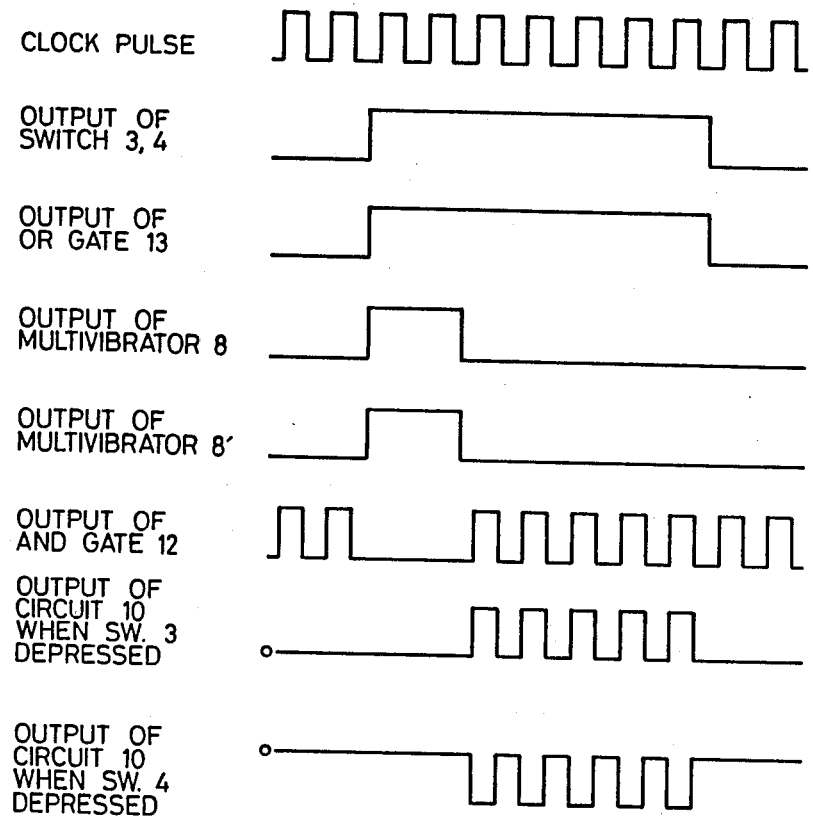
FIG. 2 is a timing chart useful for understanding the focusing apparatus of the embodiment.

The gate output of the OR circuit 13 of the manual command focusing circuit 5 is also supplied through a first monostable multivibrator (MM) 8 of the timing circuit 9 to a NAND gate 14 the output of which is in turn supplied to the AND gate 12 for performing the gate control of the AND gate 12. The Q output of the flip-flop circuit 16 is also supplied through a second monostable multivibrator (MM) 8′ of the timing circuit 9 to the NAND gate 14 for the execution of gate control of the NAND gate 14, the second monostable multivibrator 8′ being equal in time constant and polarity to the first monostable multivibrator 8. The outputs of the first and second monostable multivibrators 8, 8′ are normally kept in the low-level state and the output of the NAND gate 14 becomes in the low-level state in response to the gate output (high-level) of the OR gate 13 and the Q output (high-level) of the flip-flop circuit 16. Thus, the output of the AND gate circuit 12 becomes in the off-state for a predetermined time period after the generation of the gate output of the OR gate 13 and the generation of the Q output of the flip-flop circuit 16, i.e., after the depressing operation of the first or second switch 3 or 4 so that the generation of the drive signal P2 is stopped for the predetermined time period. The movement of the focusing lens 1 is also inhibited for the predetermined time period after the switching is performed from the automatic focuse mode to the manual command focuse mode by means of the depression of the first or second switch 3 or 4 and the focusing lens 1 is not moved to the home position in the manual command focuse mode concurrently with the mode switching operation, thereby allowing the prevention of production of an unnatural image at the switching transition from the automatic focuse mode to the manual command focuse mode. The predetermined time period can be changed by means of the adjustment of the time constant of the monostable multivibrators 8, 8′. The above-mentioned operations will be more clearly understood with reference to FIG. 2 which is a timing chart illustrating the outputs of the constituting elements.

In the focusing apparatus according to the embodiment of this invention, it is possible to easily perform the switching from the automatic focuse mode to the manual command focuse mode by means of the depression of the first or second switch 3 or 4 and further to move the focusing lens 1 in the desired directions by means of the continuous depression of the first and second switches 3, 4. Furthermore, because of the focusing lock as described above, the generation of an unnatual image can be prevented when the switching is effected from the automatic focuse mode to the manual command focuse mode.

The switching from the manual command focuse mode to the automatical focuse mode can be performed by the depression of the third switch 17.

Figure 3:
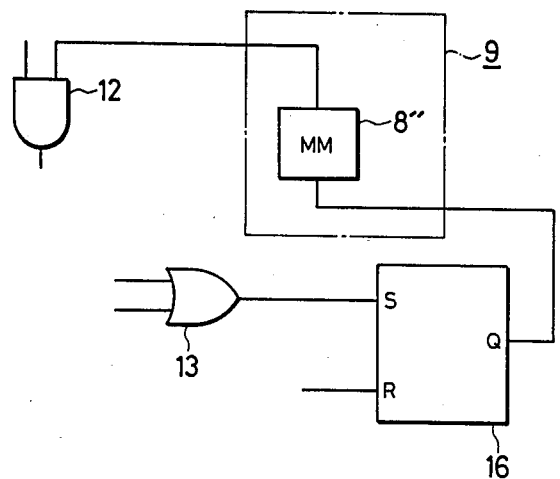
FIG. 3 is an illustration of another arrangement of the timing circuit used in the focusing apparatus of this embodiment.

It should be understood that the forgoing relates to only a preferred embodiment of the present invention, and that it is intended to cover all changes and modifications of the embodiment of the invention herein used for the purposes of the disclosure, which do not constitute departures from the spirit and scope of the invnetion. For example, it is also appropriate that the timing circuit 9 is arranged to comprises one monostable multivibrator 8″ with the polarity reverse to that of the monostable multivibrator 8 as shown in FIG. 3.

What is claimed is:

1. A focusing apparatus including a focusing lens driven in optical axis directions by a drive device, comprising:
   an automatic focus circuit for generating a first drive signal to automatically bring said focusing lens in focus;
   a manual command focus circuit for generating a second drive signal in response to a manipulation of switch means;
   a selection circuit provided between said automatic focusing circuit and said manual command focuse circuit for selectively deriving said first drive signal from said automatic focus circuit and said second drive signal from said manual command focus circuit so that either of said first drive signal or second drive signal is supplied to said drive device; and
   a timing circuit coupled to said manually focusing circuit for interrupting a supply of said second drive signal to said drive device for a predetermined time period after initiation of the switching operation performed by said selection circuit.

2. A focusing apparatus as claimed in claim 1, wherein said selection circuit is coupled to said switch means so that said second drive signal from said manual command focus circuit is coupled to said drive device in response to the manipulation of said switch means.

3. A focusing apparatus as claimed in claim 1, wherein said timing circuit includes first and second monostable multivibrators which are respectively coupled to said switch means and the outputs of which are supplied to a NAND gate, said NAND gate being coupled to said manual command focus circuit so that the timing of generation of said second drive signal is controlled in accordance with the output of said NAND gate.

* * * * *